United States Patent
Arimilli et al.

(10) Patent No.: US 8,250,307 B2
(45) Date of Patent: Aug. 21, 2012

(54) SOURCING DIFFERING AMOUNTS OF PREFETCH DATA IN RESPONSE TO DATA PREFETCH REQUESTS

(75) Inventors: Ravi K. Arimilli, Austin, TX (US); Gheorghe C. Cascaval, Carmel, NY (US); Balaram Sinharoy, Poughkeepsie, NY (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 12/024,165

(22) Filed: Feb. 1, 2008

(65) Prior Publication Data

US 2009/0198965 A1     Aug. 6, 2009

(51) Int. Cl.
*G06F 12/00* (2006.01)

(52) U.S. Cl. ........ 711/137; 711/118; 711/150; 711/154; 711/E12.004; 711/E12.057; 712/207; 712/E9.055

(58) Field of Classification Search .................. None
See application file for complete search history.

(56) References Cited

U.S. PATENT DOCUMENTS

| | | | |
|---|---|---|---|
| 4,694,395 A | 9/1987 | Young et al. | |
| 5,210,842 A | 5/1993 | Sood | |
| 5,276,850 A | 1/1994 | Sakaue | |
| 5,418,916 A | 5/1995 | Hall et al. | |
| 5,555,391 A | 9/1996 | De Subijana et al. | |
| 5,778,438 A | 7/1998 | Merchant | |
| 5,802,572 A | 9/1998 | Patel et al. | |
| 5,893,147 A | 4/1999 | Deng | |
| 5,893,151 A | 4/1999 | Merchant | |
| 5,926,829 A | 7/1999 | Hagersten et al. | |
| 6,058,456 A | 5/2000 | Arimilli et al. | |
| 6,122,729 A | 9/2000 | Tran | |
| 6,131,145 A | 10/2000 | Matsubara et al. | |
| 6,195,735 B1 * | 2/2001 | Krueger et al. | 711/137 |
| 6,199,107 B1 | 3/2001 | Dujari | |
| 6,216,219 B1 | 4/2001 | Cai et al. | |
| 6,321,306 B1 | 11/2001 | Arimilli et al. | |
| 6,345,341 B1 | 2/2002 | Arimilli et al. | |
| 6,345,342 B1 | 2/2002 | Arimilli et al. | |
| 6,353,877 B1 | 3/2002 | Duncan et al. | |
| 6,356,980 B1 | 3/2002 | Arimilli et al. | |
| 6,360,297 B1 | 3/2002 | Arimilli et al. | |

(Continued)

OTHER PUBLICATIONS

Sheu et al.; "The Selection of Optimal Cache Lines for Microprocessor Based Controllers"; Proceedings of the 23rd Annual Workshop and Symposium on Microprogramming and Micro-Architecture MICRO 23, Nov. 1990.

(Continued)

*Primary Examiner* — Michael Krofcheck
(74) *Attorney, Agent, or Firm* — Yudell Isidore Ng Russell, PLLC

(57) ABSTRACT

According to a method of data processing, a memory controller receives a prefetch load request from a processor core of a data processing system. The prefetch load request specifies a requested line of data. In response to receipt of the prefetch load request, the memory controller determines by reference to a stream of demand requests how much data is to be supplied to the processor core in response to the prefetch load request. In response to the memory controller determining to provide less than all of the requested line of data, the memory controller provides less than all of the requested line of data to the processor core.

21 Claims, 8 Drawing Sheets

U.S. PATENT DOCUMENTS

| | | | |
|---|---|---|---|
| 6,446,167 | B1 | 9/2002 | Mayfield et al. |
| 6,460,115 | B1 | 10/2002 | Kahle et al. |
| 6,470,427 | B1 | 10/2002 | Arimilli et al. |
| 6,499,085 | B2 | 12/2002 | Bogin et al. |
| 6,535,962 | B1 | 3/2003 | Mayfield et al. |
| 6,557,080 | B1 | 4/2003 | Burger et al. |
| 6,564,302 | B1 | 5/2003 | Yagi et al. |
| 6,571,319 | B2 | 5/2003 | Tremblay et al. |
| 6,571,322 | B2 | 5/2003 | Arimilli et al. |
| 6,615,321 | B2 | 9/2003 | Arimilli et al. |
| 6,643,744 | B1 | 11/2003 | Cheng |
| 6,647,466 | B2 | 11/2003 | Steely, Jr. |
| 6,681,296 | B2 | 1/2004 | Liao et al. |
| 6,704,860 | B1 | 3/2004 | Moore |
| 6,763,433 | B1 | 7/2004 | Arimilli et al. |
| 6,763,434 | B2 | 7/2004 | Arimilli et al. |
| 6,772,288 | B1 | 8/2004 | Flake et al. |
| 6,772,295 | B2 | 8/2004 | Spencer et al. |
| 6,785,772 | B2 | 8/2004 | Venkumahanti et al. |
| 6,823,447 | B2 | 11/2004 | Hay et al. |
| 6,848,071 | B2 | 1/2005 | Chaudhry et al. |
| 6,957,305 | B2 | 10/2005 | Ray et al. |
| 6,971,000 | B1 | 11/2005 | Sinharoy et al. |
| 6,978,351 | B2 | 12/2005 | Osbourne et al. |
| 7,028,159 | B2 | 4/2006 | Matsubara et al. |
| 7,062,609 | B1 | 6/2006 | Trehus et al. |
| 7,065,548 | B2 | 6/2006 | Van Oldenborgh et al. |
| 7,188,215 | B2 | 3/2007 | Hooker |
| 7,234,040 | B2 | 6/2007 | Berg et al. |
| 7,237,068 | B2 | 6/2007 | Wallin et al. |
| 7,350,032 | B2 | 3/2008 | Stenstrom |
| 7,380,047 | B2 | 5/2008 | Emma et al. |
| 7,386,701 | B2 | 6/2008 | Mowry |
| 7,441,110 | B1 | 10/2008 | Puzak et al. |
| 7,533,242 | B1 | 5/2009 | Moll et al. |
| 7,600,143 | B1 | 10/2009 | Neuman |
| 7,958,309 | B2 | 6/2011 | Arimilli et al. |
| 8,024,527 | B2 | 9/2011 | Arimilli et al. |
| 2002/0087801 | A1 | 7/2002 | Bogin et al. |
| 2002/0087809 | A1 | 7/2002 | Arimilli et al. |
| 2002/0092029 | A1 | 7/2002 | Smith |
| 2002/0112124 | A1 | 8/2002 | Arimilli et al. |
| 2002/0133674 | A1 | 9/2002 | Martin et al. |
| 2002/0138698 | A1 | 9/2002 | Kalla |
| 2002/0174253 | A1 | 11/2002 | Hayter et al. |
| 2003/0046356 | A1 | 3/2003 | Alvarex et al. |
| 2003/0084250 | A1 | 5/2003 | Gaither et al. |
| 2003/0110117 | A1 | 6/2003 | Saidenberg et al. |
| 2003/0159005 | A1 | 8/2003 | Augsburg et al. |
| 2003/0177320 | A1 | 9/2003 | Sah et al. |
| 2003/0208665 | A1 | 11/2003 | Pier et al. |
| 2004/0037276 | A1 | 2/2004 | Henderson et al. |
| 2004/0039879 | A1 | 2/2004 | Gaither |
| 2004/0049615 | A1 | 3/2004 | Liang |
| 2004/0117510 | A1 | 6/2004 | Arimilli et al. |
| 2004/0205298 | A1* | 10/2004 | Bearden et al. ............... 711/137 |
| 2004/0260879 | A1 | 12/2004 | Barroso et al. |
| 2004/0268051 | A1 | 12/2004 | Berg et al. |
| 2005/0027911 | A1 | 2/2005 | Hayter et al. |
| 2005/0053057 | A1 | 3/2005 | Deneroff et al. |
| 2005/0080994 | A1 | 4/2005 | Cohen et al. |
| 2005/0204113 | A1 | 9/2005 | Harper et al. |
| 2005/0210203 | A1 | 9/2005 | Stenstrom |
| 2005/0240729 | A1 | 10/2005 | Van Berkel et al. |
| 2005/0240736 | A1 | 10/2005 | Shaw |
| 2006/0080511 | A1 | 4/2006 | Hoover et al. |
| 2006/0085600 | A1 | 4/2006 | Miyashita et al. |
| 2006/0173851 | A1 | 8/2006 | Singh et al. |
| 2006/0174228 | A1 | 8/2006 | Radhakrishnan et al. |
| 2006/0179239 | A1 | 8/2006 | Fluhr et al. |
| 2006/0179254 | A1 | 8/2006 | Clark et al. |
| 2006/0184607 | A1 | 8/2006 | Le Leannec et al. |
| 2006/0184746 | A1 | 8/2006 | Guthrie et al. |
| 2006/0184772 | A1 | 8/2006 | Dooley et al. |
| 2006/0212648 | A1 | 9/2006 | Cox et al. |
| 2006/0251092 | A1 | 11/2006 | Matterne et al. |
| 2006/0259707 | A1 | 11/2006 | Freytag |
| 2006/0265552 | A1 | 11/2006 | David et al. |
| 2007/0038846 | A1 | 2/2007 | Kadambi et al. |
| 2007/0050592 | A1 | 3/2007 | Gschwind et al. |
| 2007/0058531 | A1 | 3/2007 | Dierks et al. |
| 2007/0079073 | A1 | 4/2007 | Rosenbluth et al. |
| 2007/0083716 | A1 | 4/2007 | Rajamony et al. |
| 2007/0088919 | A1 | 4/2007 | Shen et al. |
| 2007/0094450 | A1 | 4/2007 | Vanderwiel |
| 2007/0094453 | A1* | 4/2007 | Santhanakrishnan et al. ............... 711/137 |
| 2007/0136374 | A1 | 6/2007 | Guedalia |
| 2007/0168619 | A1 | 7/2007 | Hutton et al. |
| 2007/0214335 | A1* | 9/2007 | Bellows et al. ............... 711/167 |
| 2007/0220208 | A1* | 9/2007 | Nomura et al. ............... 711/137 |
| 2007/0294264 | A1 | 12/2007 | Bayardo, Jr. et al. |
| 2008/0056051 | A1* | 3/2008 | Mayer et al. ............ 365/230.03 |
| 2008/0086602 | A1 | 4/2008 | Guthrie et al. |
| 2008/0091921 | A1 | 4/2008 | Abuaiadh et al. |
| 2008/0104330 | A1 | 5/2008 | Deshpanda |
| 2008/0183972 | A1 | 7/2008 | Dieffenderfer |
| 2008/0244185 | A1 | 10/2008 | O'Krafka et al. |
| 2008/0256303 | A1 | 10/2008 | Croxford et al. |
| 2009/0198865 | A1 | 8/2009 | Arimilli et al. |
| 2009/0198912 | A1 | 8/2009 | Arimilli et al. |
| 2009/0198914 | A1 | 8/2009 | Arimilli et al. |
| 2009/0198960 | A1 | 8/2009 | Arimilli et al. |

OTHER PUBLICATIONS

Milenkovic et al.; "Compiler and Runtime Hints for Memory Management"; IBM TDB n8b, pp. 76-77, Jan. 1990.

Song; "Methods of Specifying Data Pre-Fetching Without Using a Separate Instruction"; IBM TDB vol. 38, No. 6, pp. 355-356, Jun. 1995.

Hazim; "System and Method to Improve Hardware Pre-Fetching Using Translation Hints"; DOSS# AUS920040822, Oct. 2004.

Wang; "Cooperative Hardware/Software Caching for Next Generation Memory Systems"; vol. 6501B of Dissertations Abstracts International, 2004.

Funk et al.; "Instruction Cache Block Retro-Fitted onto Microprocessor"; IBM TDB vol. 28, No. 7, pp. 53-56, Jul. 1995.

Van Peursem; "A New Hardware Pre-Fetching Scheme Based on Dynamic Interpretation of the instruction stream cache"; vol. 5509B of Dissertations Abstracts International; 1994.

Duncan et al.; "High Performance I/O Design in the Alphaserver 4100 Symmetric Mutliprocessing System"; Digital Technical Journal; vol. 8; No. 4; p. 61-75; 1996.

Tian et al.: "A Unified Compressed Cache Hierarchy Using Simple Frequent Pattern Compression and Partial Cache Line Pre-Fetching"; Embedded Software and Systems; Third International Conference; ICESS 2007; May 2007.

U.S. Appl. No. 12/024,170, "Varying an Amount of Data Retrieved from Memory Based upon an Instruction Hint", Non-Final Office Action dated Dec. 22, 2010.

U.S. Appl. No. 12/024,170, "Varying an Amount of Data Retrieved from Memory Based upon an Instruction Hint", Final Office Action dated May 27, 2011.

Guo et al.; "Cooperative Caching for Peer Assisted Video Distribution"; Advances in Multimedia Modeling, 13th International Multimedia Modeling Conference; MMM 2007; Lecture Notes in Computer Science; vol. 4351; pp. 135-144.

Emma et al.; "Partial Store Lines in Store in Caches"; IBM TBD; p. 4240; Dec. 1984.

J. Hoogerbrugge; "Cost Effiecient Branch Target Buffers" Euro-Par 2004 Parallel Processing; 10th International Euro-Par Conference; Lecture Notes in Computer Science; vol. 1900; pp. 950-959; Aug.-Sep. 2000.

Parmentier et al.; "Cache Based Parallelization of Multiple Sequence Alignment Problem"; Euro-Par Parallel Processing; 10th International Euro-Par Conference; Lecture Notes in Computer Science; vol. 3149; pp. 950-959 Sep. 2004.

Hwang et al.; "Delayed Precise Invalidation a Software Cache Coherence Scheme"; IEEE Proceeding Computer and Digital Techniques; vol. 143, No. 5, pp. 337-344; Sep. 1996.

Gilbert et al.;"Distributed Data Cache Designs for Clustered VLIW Processors"; IEEE Transactions on Computers; vol. 54, No. 10, pp. 1227-1241; Oct. 2005.

U.S. Appl. No. 12/024,392, "Claiming Coherency Ownership of a Partial Cache Line of Data," Non-Final Office Action dated Jan. 12, 2011.

U.S. Appl. No. 12/024,392, "Claiming Coherency Ownership of a Partial Cache Line of Data," Non-Final Office Action dated Jun. 13, 2011.

U.S. Appl. No. 12/024,424, "Data Processing System, Processor and Method that Perform a Partial Cache Line Storage-Modifying Operation Based upon a Hint," Non-Final Office Action dated Sep. 28, 2010.

U.S. Appl. No. 12/024,424, "Data Processing System, Processor and Method that Perform a Partial Cache Line Storage-Modifying Operation Based upon a Hint," Non-Final Office Action dated Aug. 12, 2011.

U.S. Appl. No. 12/024,447, "Data Processing System, Processor and Method for Implementing Cache Management for Partial Cache Line Operations, " Non-Final Office Action dated Sep. 28, 2010.

U.S. Appl. No. 12/024,447, "Data Processing System, Processor and Method for Implementing Cache Management for Partial Cache Line Operations, " Notice of Allowance dated Aug. 19, 2011.

U.S. Appl. No. 12/024,174, "Touch of a Partial Cache Line of Data," Non-Final Office Action dated Jan. 20, 2011.

U.S. Appl. No. 12/024,174, "Touch of a Partial Cache Line of Data," Final Office Action dated Jul. 1, 2011.

U.S. Appl. No. 12/024,467, "Interconnect Operation Indicating Acceptability of Partial Data Delivery," Non-Final Office Action dated Oct. 13, 2010.

U.S. Appl. No. 12/024,467, "Interconnect Operation Indicating Acceptability of Partial Data Delivery," Final Office Action dated Feb. 7, 2011.

U.S. Appl. No. 12/024,467, "Interconnect Operation Indicating Acceptability of Partial Data Delivery," Non-Final Office Action dated May 17, 2011.

U.S. Appl. No. 12/024,432, "Partial Cache Line Accesses Based on Memory Access Patterns," Non-Final Office Action dated Sep. 24, 2010.

U.S. Appl. No. 12/024,432, "Partial Cache Line Accesses Based on Memory Access Patterns," Final Office Action dated Jan. 10, 2011.

U.S. Appl. No. 12/024,432, "Partial Cache Line Accesses Based on Memory Access Patterns," Notice of Allowance dated May 16, 2011.

US Patent No. 7958309, "Dynamic Selection of a Memory Access Size," Non-Final Office Action dated Oct. 20, 2010.

US Patent No. 7958309, "Dynamic Selection of a Memory Access Size," Notice of Allowance dated Jan. 31, 2011.

U.S. Appl. No. 12/424,716, "Specifying an Access Hint for Prefetching Partial Cache Block Data in a Cache Hierarchy", Non-Final Office Action dated Aug. 31, 2011.

U.S. Appl. No. 12/424,434, "Updating Partial Cache Lines in a Data Processing System", Notice of Allowance dated Aug. 4, 2011.

U.S. Appl. No. 12/024,467, "Interconnect Operation Indicating Acceptability of Partial Data Delivery," Notice of Allowance dated Oct. 5, 2010.

U.S. Appl. No. 12/024,174, "Touch of a Partial Cache Line of Data," Final Office Action dated Oct. 5, 2011.

U.S. Appl. No. 12/024,392, "Claiming Coherency Ownership of a Partial Cache Line of Data," Final Office Action dated Nov. 18, 2011.

U.S. Appl. No. 12/024,170, "Varying an Amount of Data Retrieved from Memory Based upon an Instruction Hint," Non-Final Office Action dated Jan. 9, 2012.

U.S. Appl. No. 12/424,681, "Specifying an Access Hint for Prefetching Limited use Data in a Cache Hierarchy," Non-Final Office Action dated Sep. 6, 2011.

U.S. Appl. No. 12/424,681, "Specifying an Access Hint for Prefetching Limited use Data in a Cache Hierarchy," Notice of Allowance dated Jan. 4, 2012.

U.S. Appl. No. 12/424,432, "Partial Cache Line Accesses Based on Memory Access Patterns," Notice of Allowance dated Jul. 22, 2011.

U.S. Appl. No. 12/424,716, "Specifying an Access Hint for Prefetching Partial Cache Block Data in a Cache Hierarchy," Notice of Allowance dated Nov. 22, 2011.

U.S. Appl. No. 12/024,447, "Cache Management for Partial Cache Line Operations," Notice of Allowance dated Sep. 20, 2011.

U.S. Appl. No. 12/424,434, "Updating Partial Cache Lines in a Data Processing System," Notice of Allowance dated Oct. 6, 2011.

U.S. Appl. No. 12/024,467, " Interconnect Operation Indicating Acceptability of Partial Data Delivery," Notice of Allowance dated Oct. 5, 2011.

U.S. Appl. No. 12/024,424, "Partial cache Line Storage-Modifying Operation based upon a Hint," Notice of Allowance dated Dec. 1, 2011.

* cited by examiner

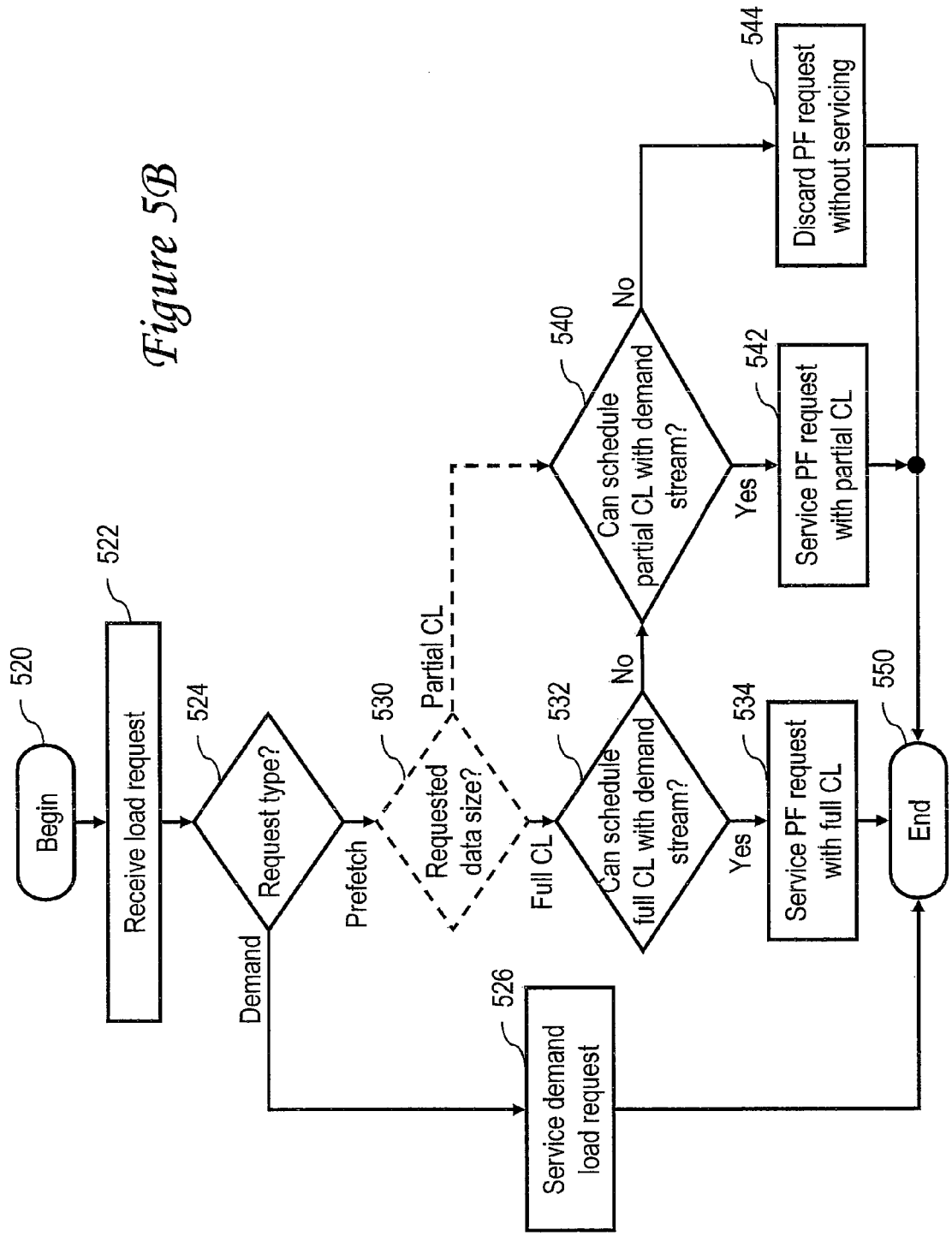

SOURCING DIFFERING AMOUNTS OF PREFETCH DATA IN RESPONSE TO DATA PREFETCH REQUESTS

This invention was made with United States Government support under Agreement No. HR0011-07-9-0002 awarded by DARPA. The Government has certain rights in the invention.

BACKGROUND OF THE INVENTION

1. Technical Field

The present invention relates in general to data processing and, in particular, data prefetching.

2. Description of the Related Art

As system memory latencies have increased in terms of processor clock cycles, computer architects have applied significant design effort to improvements in data caching (for handling previously used data) and data prefetching (for retrieving data in anticipation of use). Enhancements to data caching and data prefetching tend to be complementary in that enhancements to data caching techniques tend to achieve greater latency reductions for applications having significant data reuse, while enhancements to data prefetching tend to achieve greater latency reductions for applications having less data reuse.

In operation, hardware data prefetchers generally detect patterns of memory accesses forming one or more sequential address streams. A sequential address stream is defined as any sequence of memory accesses that reference a set of cache lines with monotonically increasing or decreasing addresses. The address offset between the addresses of adjacent memory accesses in a particular sequential address stream is often referred to as the "stride". In response to a detection of a sequential address stream, the hardware data prefetcher then prefetches up to a predetermined number of cache lines into a low latency data cache in advance of a current demand memory access.

Unfortunately, in many designs, aggressive data prefetching can exacerbate already lengthy demand memory access latencies by overwhelming memory controllers with a large number of data prefetch requests.

SUMMARY OF THE INVENTION

In at least some embodiments, a memory controller receives a prefetch load request from a processor core of a data processing system. The prefetch load request specifies a requested line of data. In response to receipt of the prefetch load request, the memory controller determines by reference to a stream of demand requests how much data is to be supplied to the processor core in response to the prefetch load request. In response to the memory controller determining to provide less than all of the requested line of data, the memory controller provides less than all of the requested line of data to the processor core.

BRIEF DESCRIPTION OF THE DRAWINGS

FIG. 5B is a high level logical flowchart of an exemplary process by which a memory controller services data prefetch requests with differing sizes of data in accordance with the present invention.

DETAILED DESCRIPTION OF ILLUSTRATIVE EMBODIMENT

Figure 1A:
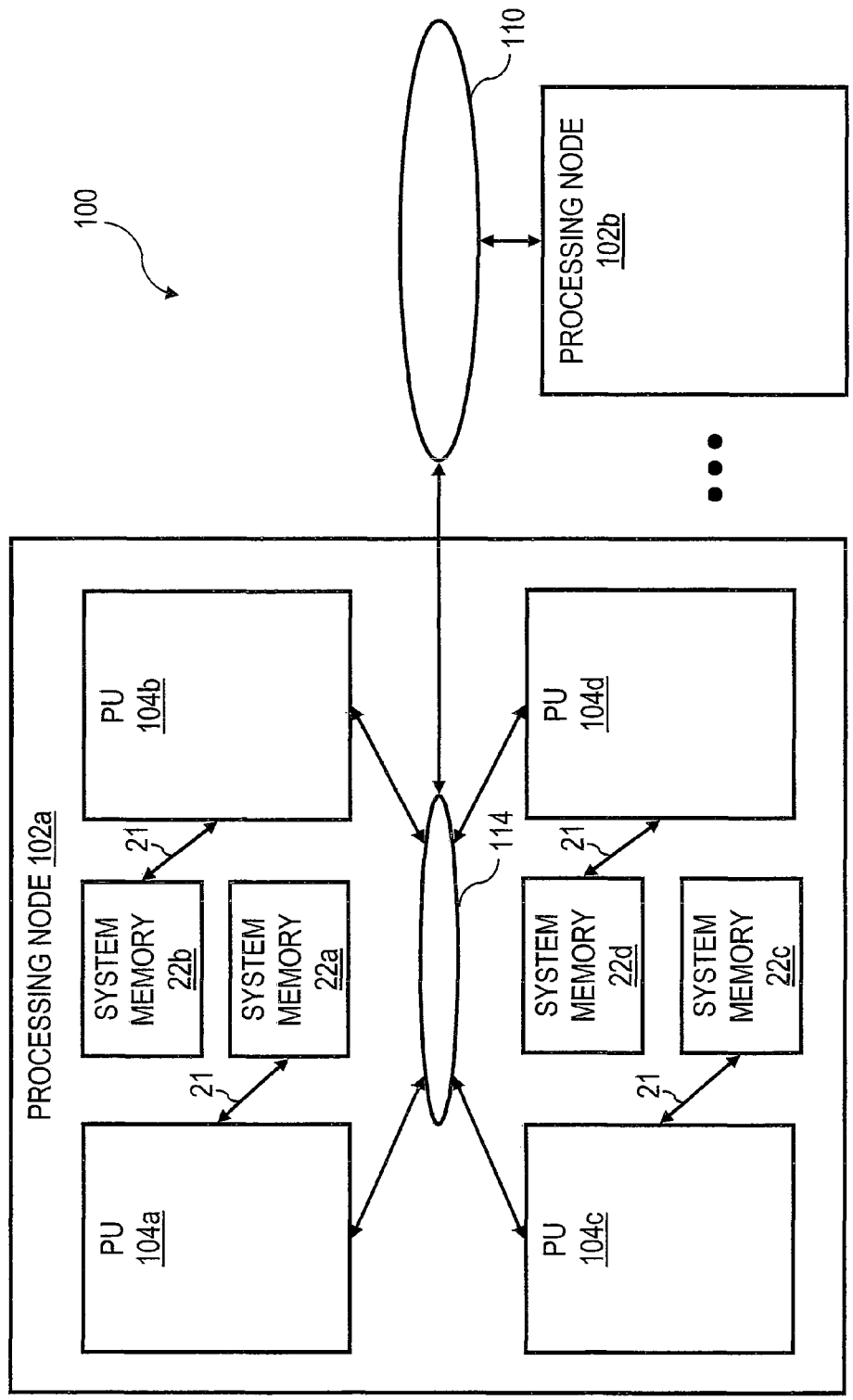
FIG. 1A is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 22a-22d. System memories 22a-22d of all of processing units 104 collectively form the lowest level of volatile memory within data processing system 100, which is generally accessible to all processing units 104 via request transactions issued on interconnect 110 and/or 114. In the depicted embodiment, access to system memories 22 is controlled by integrated memory controllers (IMCs) 206 in processing units 104 (see FIG. 2, infra), which each communicates with an external system memory 22 via a high frequency, high bandwidth memory bus 21. Of course, in alternative embodiments of the invention, memory controllers for one or more system memories 22 can be coupled to system interconnect 110 or local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 1B:
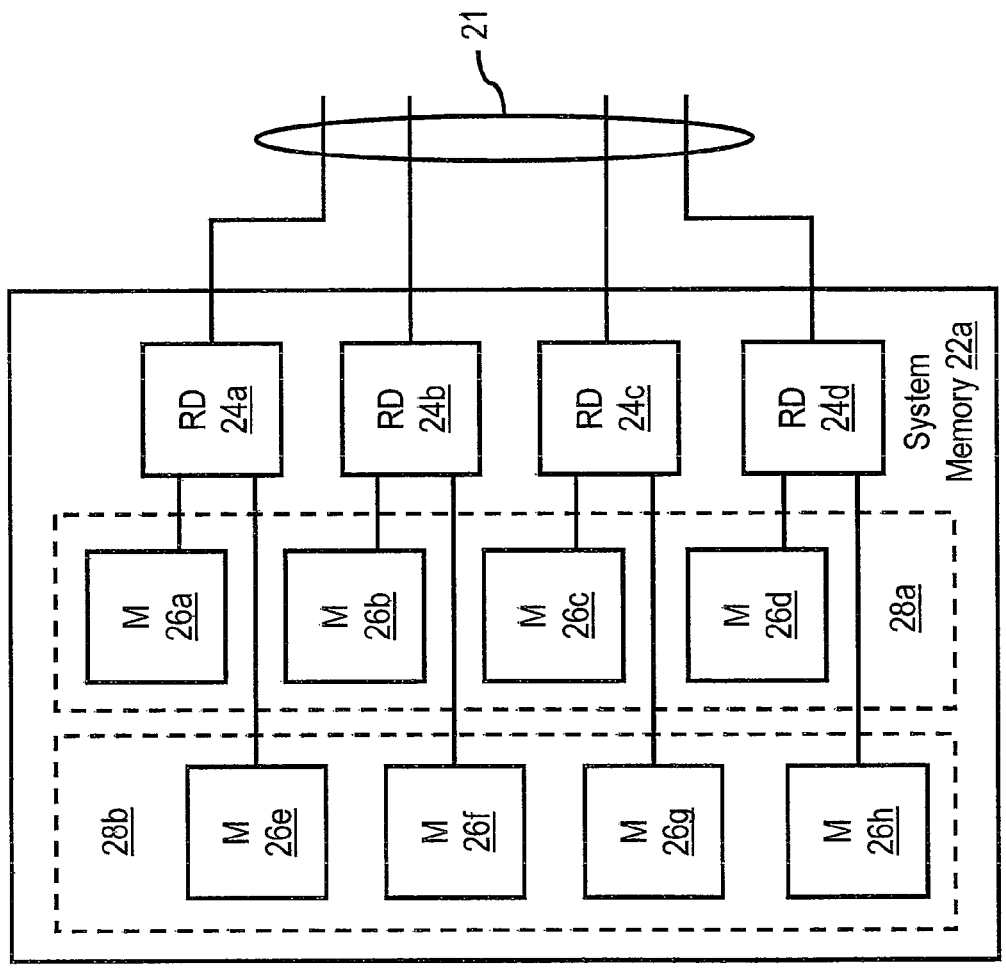
FIG. 1B is a more detailed block diagram of an exemplary system memory in accordance with the present invention.

Referring now to FIG. 1B, in an exemplary embodiment each system memory 22 is implemented with multiple redrive (RD) chips 24a 24d, each providing address and data connections for multiple (in this case two) Dynamic Random Access Memory (DRAM) Dual Inline Memory Modules (DIMMs) 26. That is, RD chip 24a is connected to DIMMs 26a, 26e; RD chip 24b is connected to DIMMs 26b, 26f; RD chip 24c is connected to DIMMs 26c, 26g; and RD chip 24d is connected to DIMMs 26d, 26h. The DIMMs 26 comprising each system memory 22 are further organized into multiple "ranks" 28a-28b each containing one DIMM 26 connected to each of RD chips 24a-24d. For example, rank 28a includes DIMMs 26a-26d, and rank 28b includes DIMMs 26e-26h. Real memory addresses may be "striped" across the DIMMs 26 comprising each rank 28 so that access latency for full cache line memory accesses is reduced.

Figure 1C:
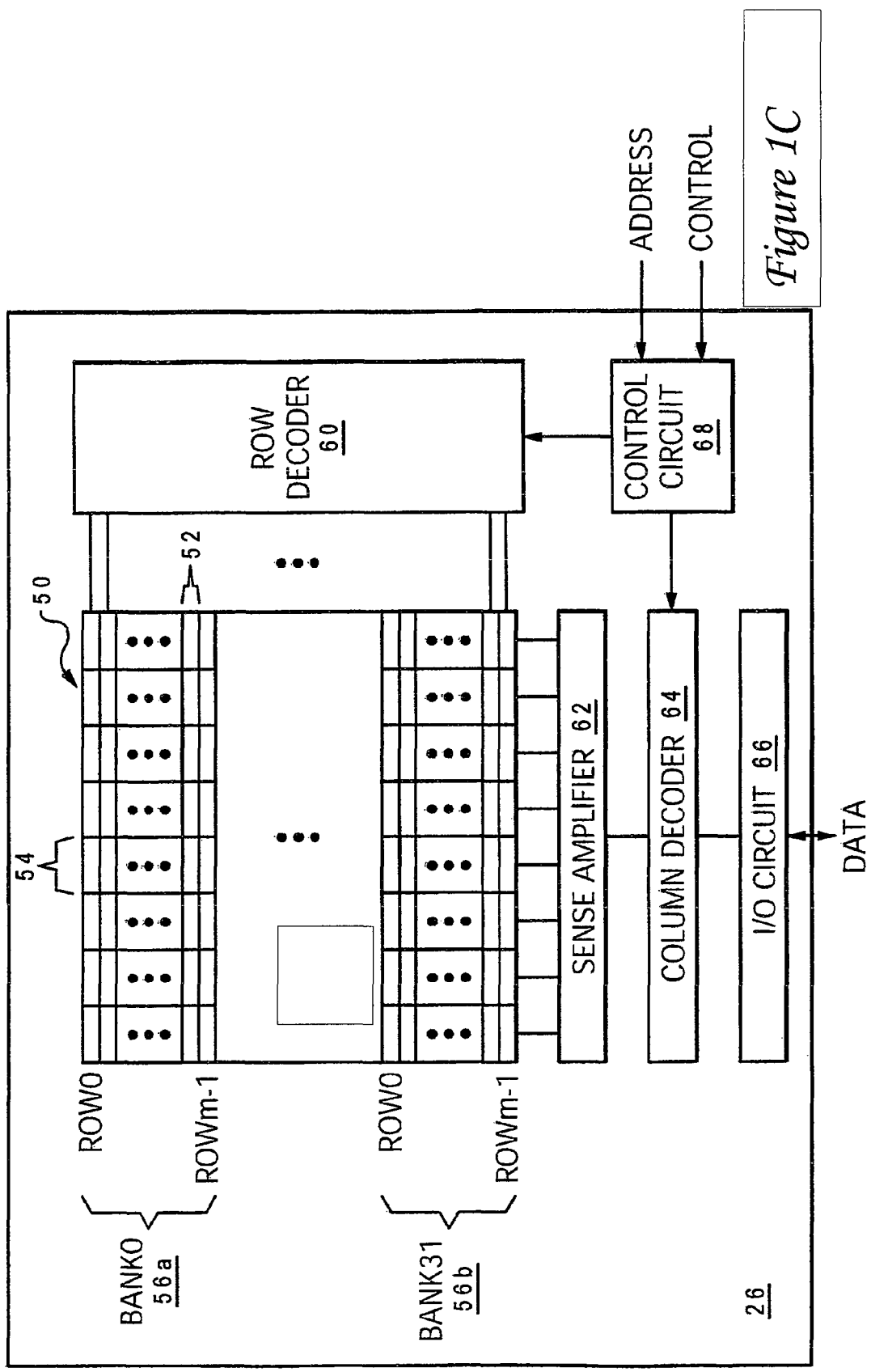
FIG. 1C is a more detailed block diagram of an exemplary system memory module in accordance with the present invention.

Referring now to FIG. 1C, there is illustrated a more detailed block diagram of an exemplary implementation of a DIMM 26 within data processing system 100 of FIG. 1. As shown, DIM 26 includes a DRAM memory array 50 containing a number of rows 52 and columns 54 of DRAM memory cells, with each combination of a row and column corresponding to a particular unique real memory address. As indicated, in the exemplary embodiment, each column 54 is 32 bytes wide, meaning that a memory access specifying the real address of a 128-byte word will be serviced by reference to one column (32 bytes) of data from each of the four DIMMs 26 within the relevant rank 28. In order to provide enhanced access bandwidth, rows 52 are organized into multiple (in this example, 32) banks 56 (e.g., 56a, 56b) of m rows 52, and memory array 50 supports concurrent access to one row 52 in each of the 32 banks. As should be apparent, the width of memory columns, the number of banks and ranks, and implementation-dependent parameters described herein will vary between embodiments of the invention.

DIMM 26 further includes a control circuit 68, row decoder 60, sense amplifier 62, column decoder 64 and I/O circuit 66 that are utilized to perform read and write accesses to memory array 50 in response to control signals and addresses (and if a write access, data) received from IMC 206 (FIG. 2) via a RD chip 24. IMC 206 initiates a memory access to a DIMM 26 by asserting or deasserting a read/write (R/W) control line and supplying a real address to an RD chip 24, which in turn, supplies the control signal and real address to the DIMM 26. Control circuit 68 within the DIMM 26 latches at least the row portion of a real address presented by the associated RD chip 24 in response to assertion of a Row Access Select (RAS) line. Row decoder 60 then decodes row portion of the real address to read out a particular row 52 within memory array 50. If the row address resolves to a different row than the immediate previous access to memory array 50, control circuit 68 precharges sense amplifiers 62 during a precharge period ($t_{RP}$).

Control circuit 68 similarly latches a column portion of the real address of interest in response to assertion of a Column Access Select (CAS) line, which follows the assertion of the RAS line by a latency period $t_{RCD}$ in order to permit the row signal to settle. The column portion of the real address is decoded by column decoder 64, which transfers the bytes of data associated with the real memory address between the sense amplifier 62 and I/O circuit 66. The period between assertion of CAS and the appearance of correct data at the output pins of I/O circuit 66 is referred to as $t_{CAC}$.

Figure 2:
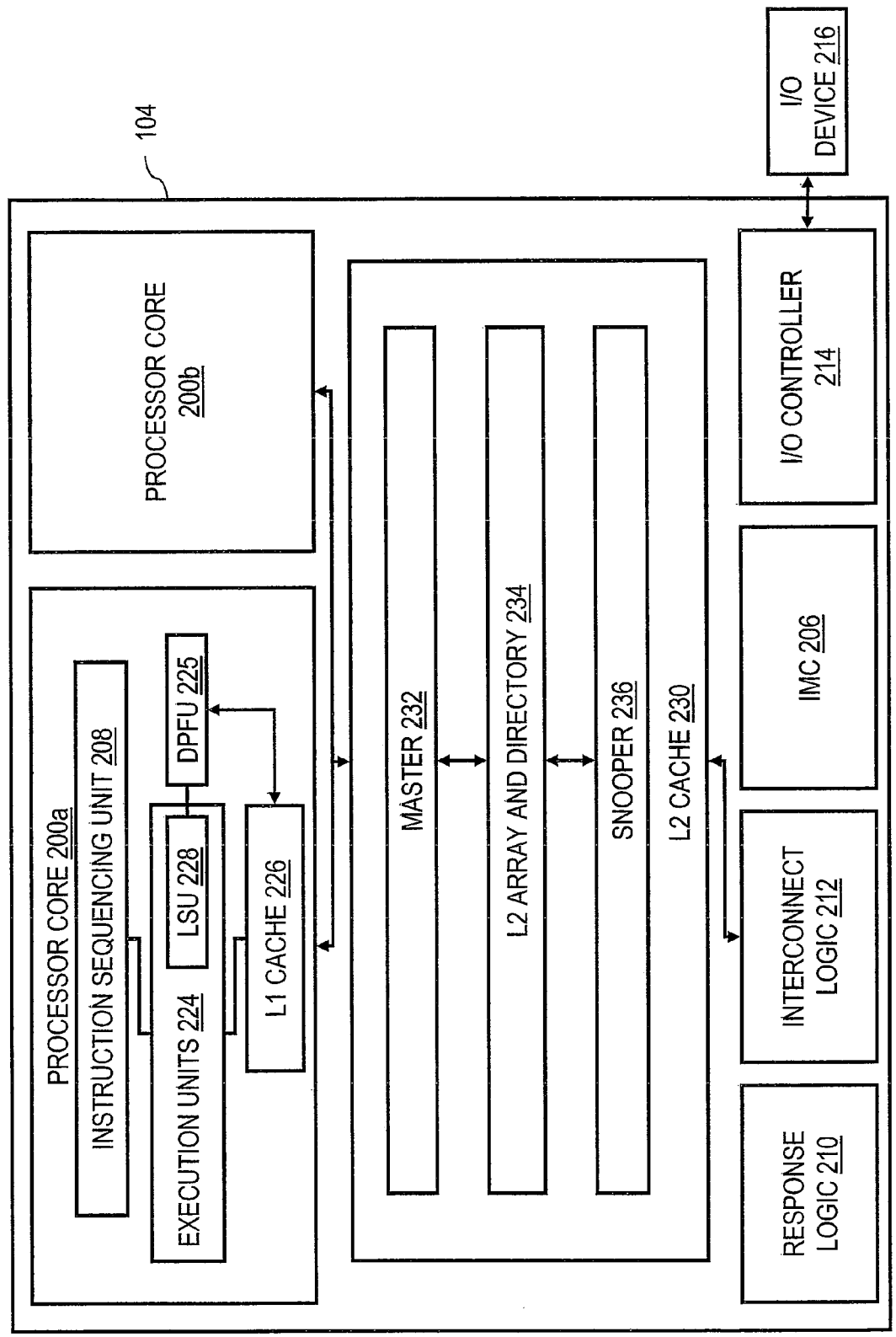
FIG. 2 is a more detailed block diagram of an exemplary processing unit in accordance with the present invention.

Referring now to FIG. 2, there is depicted amore detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for prefetching and demand fetching instructions and for ordering instructions for execution by one or more execution units 224. Execution units 224 preferably include a load-store unit (LSU) 228 for executing memory access instructions that references a memory block or cause the generation of an operation referencing a memory block. In at least some embodiments, each processor core 200 is capable of simultaneously executing instructions within two or more hardware threads of execution. Each processor core 200 preferably includes a data prefetch unit (DPFU) 225 that prefetches data in advance of demand.

The operation of each processor core 200 is supported by a multi-level volatile memory hierarchy having at its lowest level shared system memories 22a-22d, and at its upper levels one or more levels of cache memory. In the depicted embodiment, each processing unit 104 includes an integrated memory controller (IMC) 206 that controls read and write access to a respective one of the system memories 22a-22d within its processing node 102 in response to a stream of demand and prefetch requests received from local processor cores 200a-200b and operations snooped on the local interconnect 114.

In the illustrative embodiment, the cache memory hierarchy of processing unit 104 includes a store-through level one (L1) cache 226 (which may be bifurcated into separate L1 instruction and data caches) within each processor core 200 and a level two (L2) cache 230 shared by all processor cores 200a, 200b of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, L5 etc.) of on-chip or off-chip in-line, lookaside or victim cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
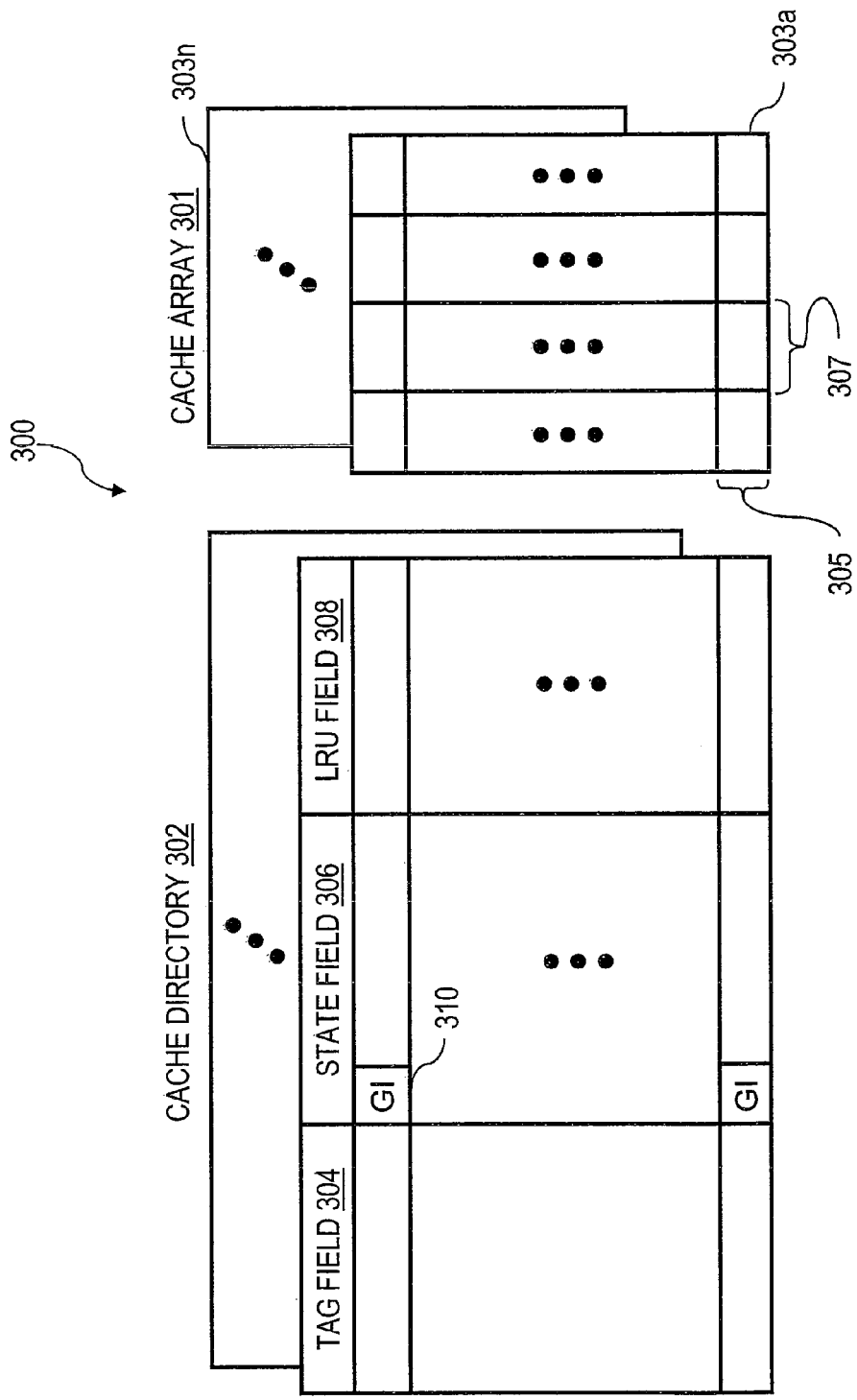
FIG. 3 is a more detailed block diagram of an exemplary cache array and directory in accordance with the present invention.

With reference now to FIG. 3, there is illustrated a more detailed block diagram of an exemplary embodiment of a cache array and directory 300, which may be utilized, for example, to implement the cache array and directory of an L1 cache 226 or L2 cache array and directory 234. As illustrated, cache array and directory 300 includes a set associative cache array 301 including multiple ways 303a-303n. Each way 303 includes multiple entries 305, each providing temporary storage for up to a full cache line of data, e.g., 128 bytes. Each cache line of data is logically formed of multiple granules 307 (in this example, four granules of 32 bytes each) that may correspond in size, for example, to the smallest allowable access to system memories 22. In accordance with the present invention, granules 307 may be individually accessed and cached in cache array 301.

Cache array and directory 300 also includes a cache directory 302 of the contents of cache array 301. As in conventional set associative caches, memory locations in system memories 22 are mapped to particular congruence classes within cache arrays 301 utilizing predetermined index bits within the system memory (real) addresses. The particular cache lines stored within cache array 301 are recorded in cache directory 302, which contains one directory entry for each cache line in cache array 301. As understood by those skilled in the art, each directory entry in cache directory 302 comprises at least a tag field 304, which specifies the particular cache line stored in cache array 300 utilizing a tag portion of the corresponding real address, a LRU (Least Recently Used) field 308 indicating a replacement order for the cache line with respect to other cache lines in the same congruence class, and a state field 306, which indicates the coherency state of the cache line.

According to the present invention, coherency states that may be utilized in state field 306 to indicate state information may be defined by the well-known MESI coherency protocol or a variant thereof. To support caching of partial cache lines in cache array 301, cache directory 302 preferably indicates which granule(s) 307 are cached in the associated entry 305. For example, in one embodiment, each state field 306 includes a granule identifier (GI) 310 that indicates which granule(s) of the cache line identified by the tag in tag field 304 are held in the associated entry 305 of cache array 301. In at least some embodiments, when GI 310 indicates that fewer than all granules of a cache line are held in the associated entry 305, state field 306 preferably indicates a "Partial" coherency state that indicates that less than the complete cache line is held by cache array 301. In such embodiments, the Partial coherency state functions like the Shared coherency state of the MESI protocol, meaning that a full copy of the cache line must be obtained prior to modification of the contents of the cache line.

Figure 4:
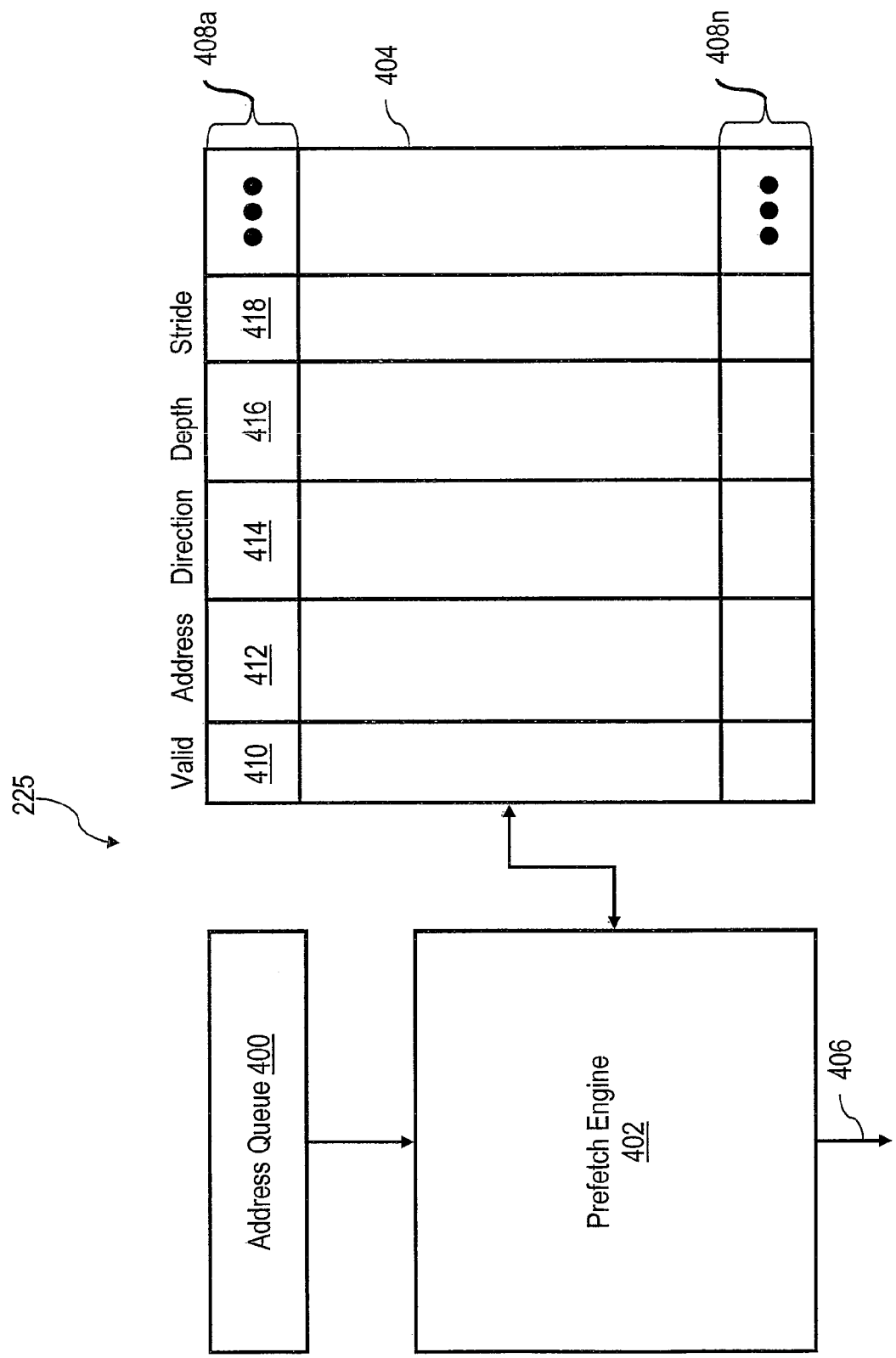
FIG. 4 is a more detailed block diagram of the data prefetch unit of FIG. 1.

Referring now to FIG. 4, there is depicted a more detailed block diagram of an exemplary data prefetch unit (DPFU) 225 in accordance with the present invention. As shown, DPFU 225 includes an address queue 400 that buffers incoming memory access addresses generated by LSU 228, a prefetch request queue (PRQ) 404, and a prefetch engine 402 that generates data prefetch requests 406 by reference to PRQ 404.

Prefetch requests 406 cause data from the memory subsystem to be fetched or retrieved into L1 cache 228 and/or L2 cache 230 preferably before the data is needed by LSU 228. The concept of prefetching recognizes that data accesses frequently exhibit spatial locality. Spatial locality suggests that the address of the next memory reference is likely to be near the address of recent memory references. A common manifestation of spatial locality is a sequential data stream, in which data from a block of memory is accessed in a monotonically increasing (or decreasing) sequence such that contiguous cache lines are referenced by at least one instruction. When DPFU 225 detects a sequential data stream (e.g., references to addresses in adjacent cache lines), it is reasonable to predict that future references will be made to addresses in cache lines that are adjacent to the current cache line (the cache line corresponding to currently executing memory references) following the same direction. Accordingly, DPFU 225 generates data prefetch requests 406 to retrieve one or more of these adjacent cache lines before the program actually requires them. As an example, if a program loads an element from a cache line n, and then loads an element from cache line n+1, DPFU 225 may prefetch cache some or all of cache lines n+2 and n+3, anticipating that the program will soon load from those cache lines also.

As further depicted in FIG. 4, in at least some embodiments, PRQ 404 includes a plurality of stream registers 408. In the depicted embodiment, each stream register 408 contains several fields describing various attributes of a corresponding sequential data stream. These fields include a valid field 410, an address field 412, a direction field 414, a depth field 416, a stride field 418, and optionally, one or more additional fields. Valid field 410 indicates whether or not the contents of its stream register 408 are valid. Address field 402 contains the base address (effective or real) of a cache line or partial cache line in the sequential data stream. Direction field 414 indicates whether addresses of cache lines in the sequential data stream are increasing or decreasing. Depth field 416 indicates a number of cache lines or partial cache lines in the corresponding sequential data stream to be prefetched in advance of demand. Stride field 418 indicates an address interval between adjacent cache lines or partial cache lines within the sequential data stream.

Figure 5A:
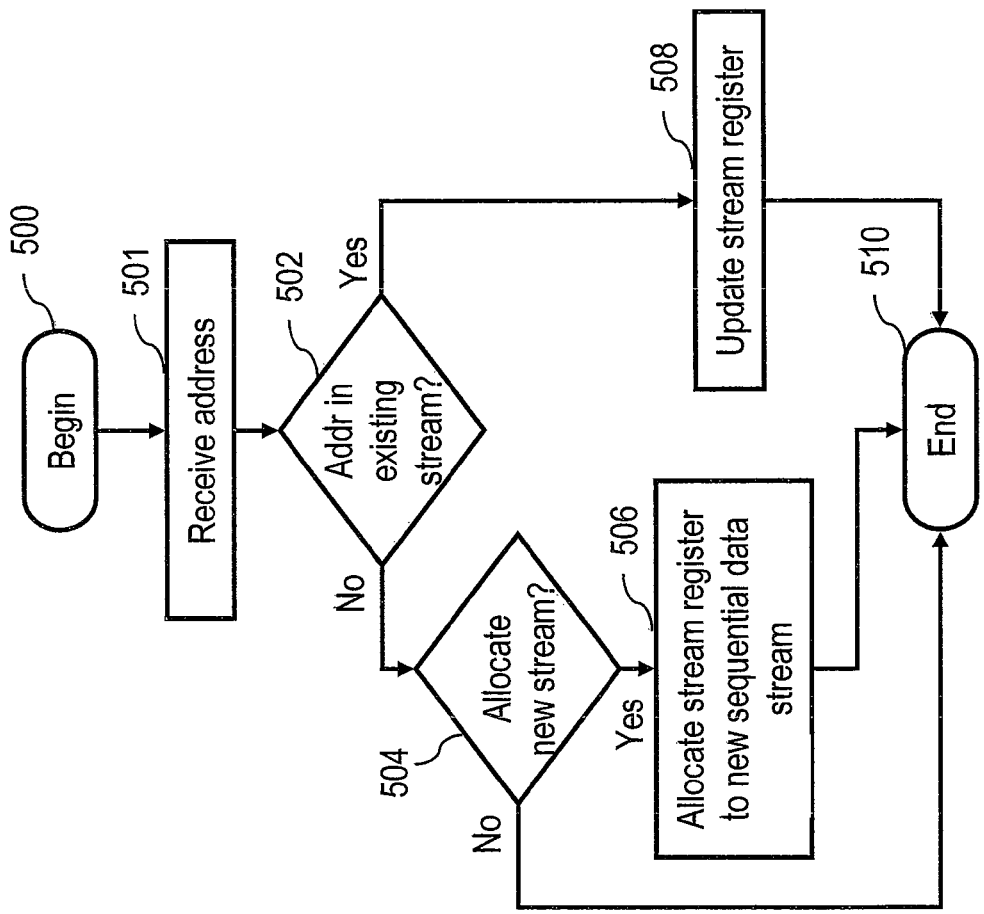
FIG. 5A is a high level logical flowchart of an exemplary process by which a data prefetch unit allocates entries in a prefetch request queue in accordance with the present invention.

With reference now to FIG. 5A, there is depicted a high level logical flowchart of an exemplary process by which DPFU 225 allocates entries in PRQ 404 in accordance with the present invention. The process begins at block 500 and the proceeds to block 501, which depicts DPFU 225 receiving from LSU 228 within address queue 400 a memory access address (e.g., effective or real address) of a demand memory access. The process then proceeds to block 502, which depicts prefetch engine 402 of DPFU 225 determining by reference to PRQ 404 whether or not the address received at block 501 falls within an existing sequential data stream to which a stream register 408 has been allocated. If prefetch engine 402 determines at block 504 that the address belongs to an existing sequential data stream, the process proceeds to block 508, which is described below. If prefetch engine 402 determines at block 504 that the address does not belong to an existing sequential data stream, prefetch engine 402 determines at block 504 whether or not to allocate a new sequential data stream, for example, based upon a miss for the memory access address in L1 cache 226, the availability of an unallocated stream register 408, and/or previous receipt of a closely spaced memory access address.

If prefetch engine 402 determines to not allocate a new sequential data stream at block 504, the process shown in FIG. 5 simply terminates at block 510. If however, prefetch engine 402 determines to allocate a new sequential data stream at block 504, prefetch engine 402 allocates one of stream registers 408 to the sequential data stream and populates fields 410-420 of the allocated stream register 408. Allocation of the stream register 408 may entail selection of a stream buffer 408 based upon, for example, the contents of usage history fields 420 of stream registers 408 and/or unillustrated replacement history information indicating a stream register 408 to be replaced according to a replacement algorithm, such as Least Recently Used (LRU) or round robin. Following block 506, the process terminates at block 510.

Referring now to block 508, in response to a determination that the memory access address received at block 501 falls within an existing sequential data stream to which a stream register 408 has been allocated in PRQ 404, prefetch engine 402 updates the state of the stream register 408 allocated to the sequential data stream. For example, prefetch engine 402 may update address field 412 with the memory access address or modify depth field 416 or stride field 418. Following block 508, the process terminates at block 510.

With reference now to FIG. 5B, there is illustrated a high level logical flowchart of an exemplary process by which a memory controller 206 selectively services data prefetch requests with differing amounts of data in accordance with the present invention.

The process depicted in FIG. 5B begins at block 520 and then proceeds to block 522, which illustrates an integrated memory controller (IMC) 206 (FIG. 2) receiving a load request from a processor core 200 its processing unit 104 or in another processing unit 104 via local interconnect 114. In response to receipt of the load request, IMC 206 determines at block 524 the type of load request, and in particular, whether the load request is a demand load request or a data prefetch request 406. If IMC 206 determines at block 524 that the load request is a demand load request, IMC 206 services the demand load request in a conventional manner, as depicted at block 526. Thereafter, the process terminates at block 550.

Returning to block 524, if IMC 206 determines at block 524 that the load request is a data prefetch request 406, IMC 206 optionally determines at block 530 whether the data prefetch request 406 requests a full cache line (e.g., 128 bytes) or partial cache line (e.g., 32 bytes) of prefetch data. If IMC 206 determines at block 530 that the received data prefetch request 406 is for a partial cache line of prefetch data, the process passes to block 540, which is described below. If, however, the data prefetch request 406 requests a full cache line of data or if block 530 is omitted, IMC 206 determines at block 532 whether access to a full cache line of prefetch data from the associated system memory 22 can be scheduled given the current stream of demand load and/or store requests received by IMC 206. In at least one preferred embodiment, the determination depicted at block 532 takes into account criteria such as power consumption, the particular ranks and banks of system memory 22 that are or will be accessed by demand requests, the impact of servicing the data prefetch request 406 on the access latency of demand requests, etc. In response to an affirmative determination at block 532, IMC 206 generates the appropriate address and control signals to cause the associated system memory 22 to provide a full cache line of data to the requesting processor core 200 in response to the data prefetch request 406. Thereafter, the process terminates at block 550.

Returning to block 532, if IMC 206 makes a negative determination, IMC 206 determines whether access to a partial cache line of prefetch data from the associated system memory 22 can be scheduled given the current stream of demand load and/or store requests received by IMC 206. In at least one preferred embodiment, the determination depicted at block 540 takes into account criteria such as power consumption, the particular ranks and banks of system memory 22 that are or will be accessed by demand requests, the impact of servicing the prefetch data request 406 on the access latency of demand requests, etc. In response to a negative determination at block 540, IMC 206 discards the data prefetch request 406 received at block 522 without servicing the data prefetch request 406 or accessing system memory 22, as shown at block 544, and the process terminates at block 550. The data prefetch request 406 can, of course, be discarded without affecting correctness because such data prefetch requests, by definition, are speculative in nature. If, however, IMC 206 makes an affirmative determination at block 540, IMC 206 generates the appropriate address and control signals to cause the associated system memory 22 to provide a partial cache line of data selected by IMC 206 to the requesting processor core 200 in response to the data prefetch request 406. For example, IMC 206 may reduce power consumption by electing to provide a partial cache line in response to a data prefetch request 406 if the partial cache line resides in the same row accessed by a demand request concurrently being serviced by IMC 206. Following block 542, the process terminates at block 550.

As has been described, in at least some embodiments, a memory controller receives a prefetch load request from a processor core of a data processing system. The prefetch load request specifies a requested line of data. In response to receipt of the prefetch load request, the memory controller determines by reference to a stream of demand requests how much data is to be supplied to the processor core in response to the prefetch load request. In response to the memory controller determining to provide less than all of the requested line of data, the memory controller provides less than all of the requested line of data to the processor core.

While the invention has been particularly shown as described with reference to a preferred embodiment, it will be understood by those skilled in the art that various changes in form and detail may be made therein without departing from the spirit and scope of the invention.

What is claimed is:

1. A method of data processing in a data processing system having a system memory controlled by a memory controller, said method comprising:
   the memory controller receiving a prefetch load request from a processor core of the data processing system, wherein the prefetch load request identifies a line of data;
   in response to receipt of the prefetch load request, the memory controller determining by reference to a stream of demand requests how much data is to be supplied to the processor core in response to the prefetch load request, wherein the determining includes electing to provide less than all of the line of data in response to the prefetch load request if the line of data identified by the prefetch load request is in a same row of the system memory as that accessed by a demand request concurrently being serviced by the memory controller and electing to provide none of the line of data in response to the prefetch load request if the line of data identified by the prefetch load request is not in the same row of the system memory as that accessed by the demand request concurrently being serviced by the memory controller; and
   in response to the memory controller determining to provide less than all of the identified line of data, providing less than all of the identified line of data to the processor core.

2. The method of claim 1, wherein said providing comprises the memory controller discarding the prefetch load request without providing any of the identified line of data to the processor core under some conditions.

3. The method of claim 1, wherein said providing comprises providing a partial line of data to the processor core.

4. The method of claim 1, wherein said determining comprises determining how much data is to be supplied based in part on which bank of the system memory is accessed by at least one demand request in the stream of demand requests received by the memory controller.

5. The method of claim 4, wherein the determining further includes determining how much data is to be supplied based in part on an impact of servicing the prefetch load request on access latency of one or more demand requests in the stream of demand requests.

6. The method of claim 1, wherein said prefetch load request requests less than all of the identified line of data.

7. The method of claim 1, and further comprising:
in response to the memory controller determining to provide all of the identified line of data, providing all of the identified line of data to the processor core.

8. The method of claim 1, wherein the determining further includes determining how much data is to be supplied based on power consumption of the system memory required to service the stream of demand requests.

9. A memory controller for a data processing system having a system memory controlled by the memory controller, wherein in response to receiving a prefetch load request from a processor core of the data processing system, said prefetch load request identifying a line of data, the memory controller determines how much data is to be supplied to the processor core by reference to one or more demand requests in a stream of demand requests and, in response to determining to provide less than all of the identified line of data, provides less than all of the identified line of data to the processor core, wherein:
the memory controller elects to provide less than all of the line of data in response to the prefetch load request if the line of data identified by the prefetch load request is in a same row of the system memory as that accessed by a demand request concurrently being serviced by the memory controller and elects to provide none of the line of data in response to the prefetch load request if the line of data identified by the prefetch load request is not in the same row of the system memory as that accessed by the demand request concurrently being serviced by the memory controller.

10. The memory controller of claim 9, wherein in response to the determination, the memory controller discards the prefetch load request without providing any of the identified line of data to the processor core under some conditions.

11. The memory controller of claim 9, wherein said memory controller provides a partial line of data to the processor core.

12. The memory controller of claim 9, wherein said memory controller determines how much data is to be supplied based in part upon which bank of the system memory is accessed by at least one demand request in the stream of demand requests received by the memory controller.

13. The method of claim 12, wherein the memory controller further determines how much data is to be supplied based in part on an impact of servicing the prefetch load request on access latency of one or more demand requests in the stream of demand requests.

14. The memory controller of claim 9, wherein the prefetch load request requests less than all of the identified line of data.

15. The memory controller of claim 9, wherein the memory controller, responsive to determining to provide all of the identified line of data, provides all of the identified line of data to the processor core in response to the prefetch load request.

16. A data processing system, comprising:
a processor core that generates a prefetch load request;
a system memory; and
a memory controller coupled to the system memory and to the processor core, wherein in response to receiving the prefetch load request from the processor core, said prefetch load request identifying a line of data, the memory controller determines how much data is to be supplied to the processor core by reference to one or more demand requests in a stream of demand requests and, in response to determining to provide less than all of the identified line of data, provides less than all of the identified line of data to the processor core, wherein:
the memory controller elects to provide less than all of the line of data in response to the prefetch load request if the line of data identified by the prefetch load request is in a same row of the system memory as that accessed by a demand request concurrently being serviced by the memory controller and elects to provide none of the line of data in response to the prefetch load request if the line of data identified by the prefetch load request is not in the same row of the system memory as that accessed by the demand request concurrently being serviced by the memory controller.

17. The data processing system of claim 16, wherein in response to the determination, the memory controller discards the prefetch load request without providing any of the identified line of data to the processor core under some conditions.

18. The data processing system of claim 16, wherein said memory controller provides a partial line of data to the processor core.

19. The data processing system of claim 16, wherein said memory controller determines how much data is to be supplied based in part upon which bank of the system memory is accessed by at least one demand request in the stream of demand requests received by the memory controller.

20. The data processing system of claim 16, wherein the prefetch load request requests less than all of the identified line of data.

21. The data processing system of claim 16, wherein the memory controller, responsive to determining to provide all of the identified line of data, provides all of the identified line of data to the processor core in response to the prefetch load request.

* * * * *